J. B. West.
Tailoring.
N° 45,780.   Patented Jan. 3, 1865.

Sheet 1 – 4 Sheets.

Witnesses
Gustavus Dietrich
Edwin S. Jacob

Inventor.
John B. West

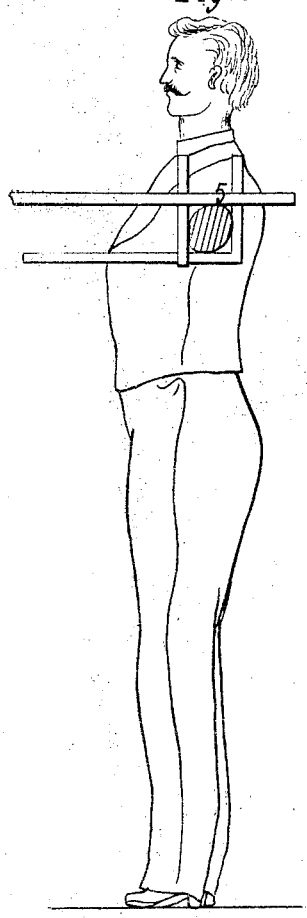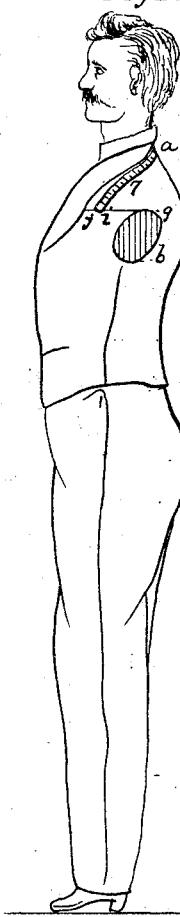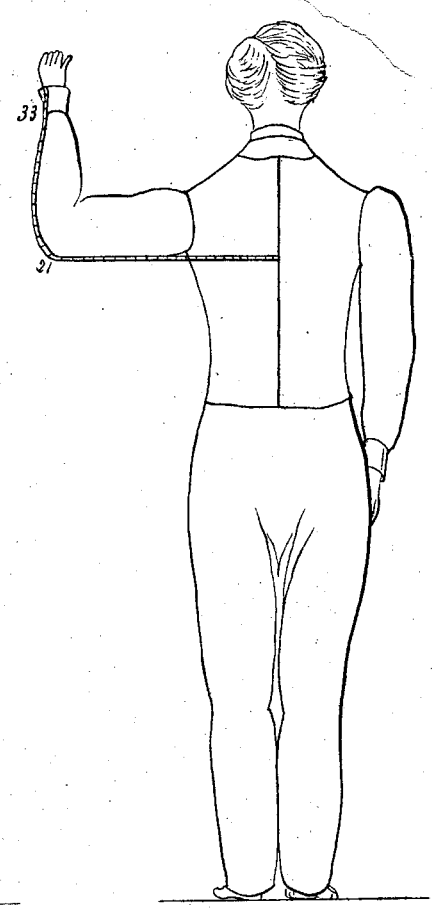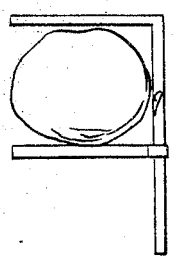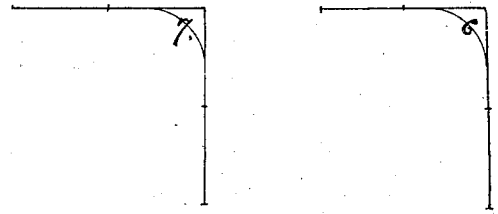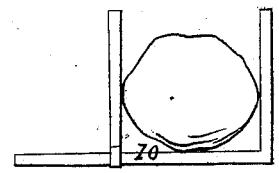

J. B. West.
Tailoring
N° 45,780. Patented Jan. 3, 1865.

Witnesses.
Gustavus Dieterich
Edwin S. Jacob.

Inventor.
John B. West

J. B. West.
Tailoring.

Nº 45,780. Patented Jan. 3, 1865.

Witnesses.
Gustavus Dieterich
Edwin S. Jacob

Inventor.
John B. West

UNITED STATES PATENT OFFICE.

JOHN B. WEST, OF NEW YORK, N. Y.

IMPROVEMENT IN GARMENT-MEASURING.

Specification forming part of Letters Patent No. 45,780, dated January 3, 1865; antedated September 8, 1862.

*To all whom it may concern:*

Be it known that I, JOHN B. WEST, of New York city, in the county and State of New York, have invented a new and useful Improvement in Measuring and Drafting Garments; and I do hereby declare that the following is a full, clear, and exact description of the same, reference being had to the accompanying drawings, forming part of this specification.

My invention consists in a new mode of determining the size and form of a human body by an angle-square, slide, straight-edge bar, and tape, and then reproducing an exact outline of the body on cloth, and using the same as a pattern from which to determine the size and shape of the coat, vest, or other garment to be drafted and cut.

To enable others skilled in the art to practice my invention, I will proceed to describe the same with reference to the drawings.

S is the angle-square, T the movable slide thereof, and U the straight-edge bar. Each of the arms of the square is graduated with two rows of figures, the inner rows commencing with the figure 1 on the inner corner of the square, and the outer rows commencing also with the figure 1 on the outer corner of the square. Thus the amount of material used to form the corner of the square adds an additional inch to the outer rows of figures, and takes an equal amount from the inner rows. The inner rows of figures serve for indicating at once the exact size of any part measured within the square, while the outer rows serve for indicating, in like manner, the exact length of any line measured by the outside edges of the square.

Figure 3:
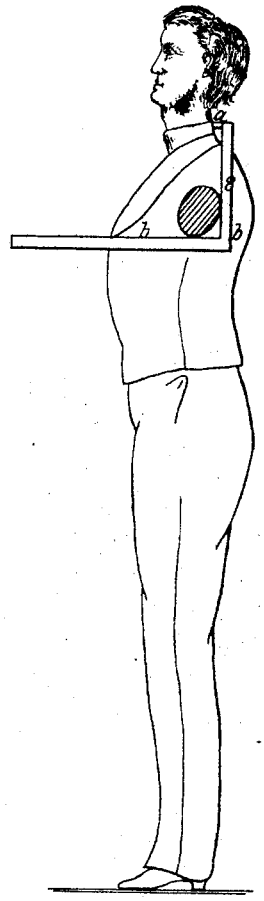
Figure 1:
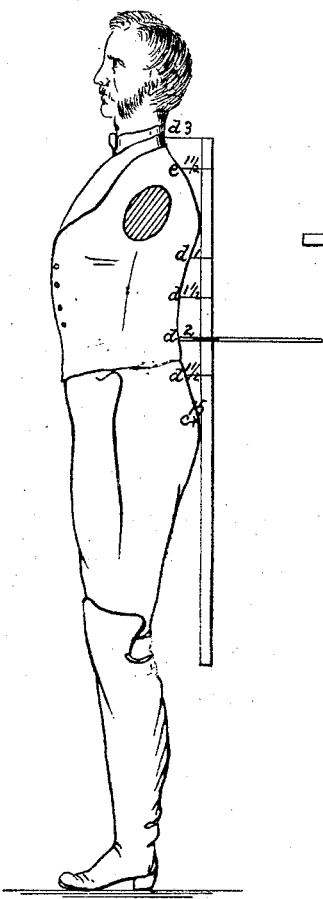
Figure 4:
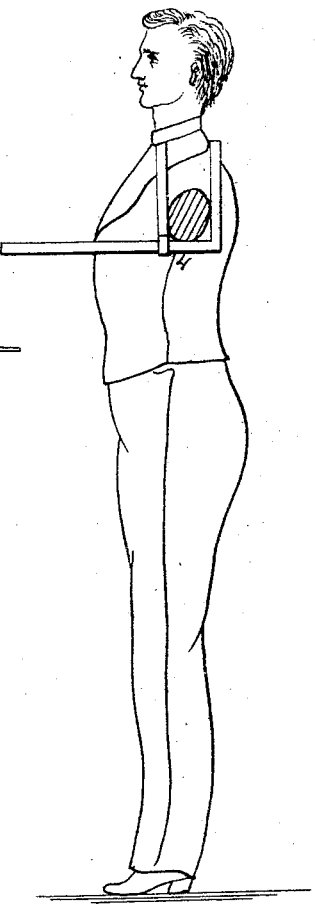
Figure 2:
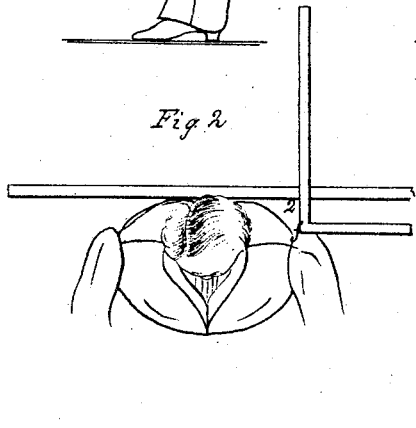
Figure 6:
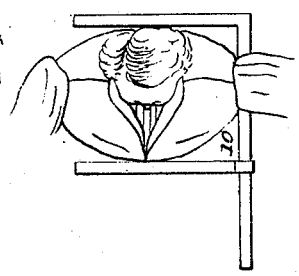
Figure 7:
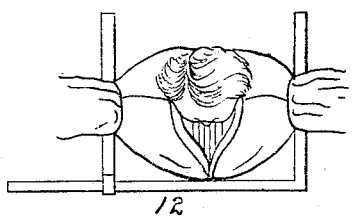
Figure 11:
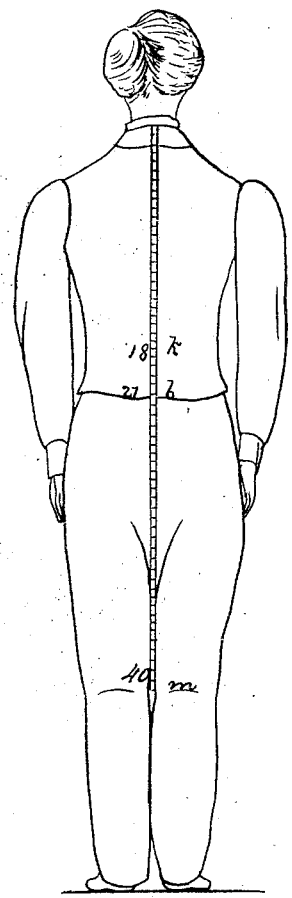
Figures 14, 15:
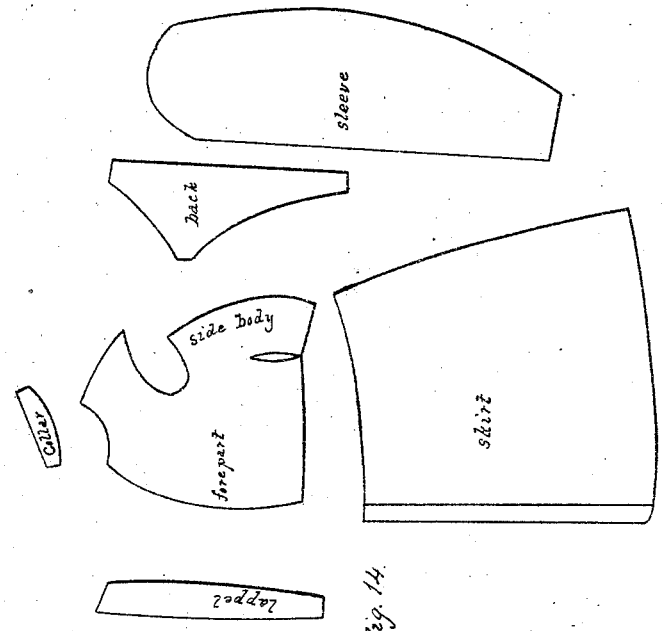

*To measure a person with the square S, slide T, straight-edge U, and tape V.*—First, determine by the eye and mark with chalk on the person to be measured the point or height of the socket-bone, as indicated at *a*, Figure 1. Then place the straight-edge bar U perpendicular against the back, as at Fig. 1, and adjust the square S under the arm as in Fig. 3, so that the long arm of the square runs horizontal and its short arm perpendicular to the straight-edge. Now make with chalk on the blade and breast guide-marks *b b*, Fig. 3; also make a similar mark *c*, Fig. 1, on the hip, where the straight-edge touches. Now take the distance from the mark on the blade to the mark on the hip and divide it into spaces of three inches, and mark the spaces on the body, as at *d d d d*, Fig. 1. Now go down from the socket-bone *a* three inches and make a chalk-mark on the body, as at *e*. Now readjust the straight-edge on the back, as in Fig. 1, and take the square and measure the distance from the straight-edge to the socket-bone, and set down the same in numerals, as illustrated in Fig. 15. In like manner measure the distance from the straight-edge to the points *e d d d d* of the body, and set down the numerals, indicating the distances, as in Fig. 15. These points give the incline of the shoulder and the curve of the back. Next place the straight-edge U horizontally across the back at the mark *b* on the blade, as in Fig. 3. Then take the square S and measure in from the straight-edge to the back part of the shoulder, as at *f*. Then place the square under the arm of the body so that its short arm is vertical and close up to the back, as in Fig. 3. Then adjust the straight-edge bar horizontally against the socket-bone *a*, as in Fig. 3, so that the straight-edge bar rests against the square. Now mark the vertical distance indicated by the square as existing between the bottom of the shoulder or under part of the arm and the socket-bone, as at *a b* in Fig. 3. Having set down the last distances, as in Fig. 15, next bring the slide T in front of the shoulder, and ascertain the width of the same from front to rear, as in Fig. 4; also place the straight-edge on the top of the shoulder, as in Fig. 5, and ascertain the depth from the top to the bottom of the shoulder. Set down, as in Fig. 15, the sizes last obtained, and then adjust the square under the arm so that its short arm rests across the blades on the back, and bring the slide up the breast in front, as in Fig. 6, and thus find the depth of the breast. Next place the short arm of the square under the left arm of the body, and the long arm of the square across the breast, and bring the slide under the right arm of the body, and thus ascertain the width of the breast, as in Fig. 7. Set down the sizes ascertained, as in Fig. 15, and then place the long arm of the square across the left side of the waist of the body, allowing the short arm of the square to come in contact with the most hollow part of the back, and bring the slide up in front of the body, as in Fig. 8, and thus ascertain the depth of the waist of the body. Then place the short arm of the square against the left side of the waist and allow the long arm of the square to pass in front thereof, and the slide to come up on the right side, and thus ascertain the width of the waist, as in Fig. 9. This accomplished, and sizes set down, as in Fig. 15, take the distance from the bottom $b$ of the shoulder to the top $g$, Fig. 10, by the square, and make the mark $i$ parallel with the top of the shoulder, as in Fig. 10. This completes the measurements with the square, slide, and straight-edge bar, and it is now necessary to take the tape V and start at the socket-bone $a$, Fig. 10, of the neck, and run down to the horizontal line $i$ of the shoulder—say two inches in front of the perpendicular line of the shoulder—to ascertain the height of the front $j$ of the shoulder, as in Fig. 10; and then to start with the tape from the socket-bone and go down to the points $k$, $l$, and $m$, and ascertain the length of the natural waist of the body, as at $k$, and the full length of the waist for the coat, as at $l$, and also the length of the skirt of the coat, as at $m$, in Fig. 11; and, finally, to start with the tape from the center of the back to the elbow of the arm, and to the hand, to ascertain the full length for the sleeve, as at Fig. 12. This completes the measures for a coat, and from the measures ascertained the tailor is enabled to draft the form of the body, as the elevations are indicated by the straight-edge, and the depressions by the numerals in Fig. 15.

Figure 13:
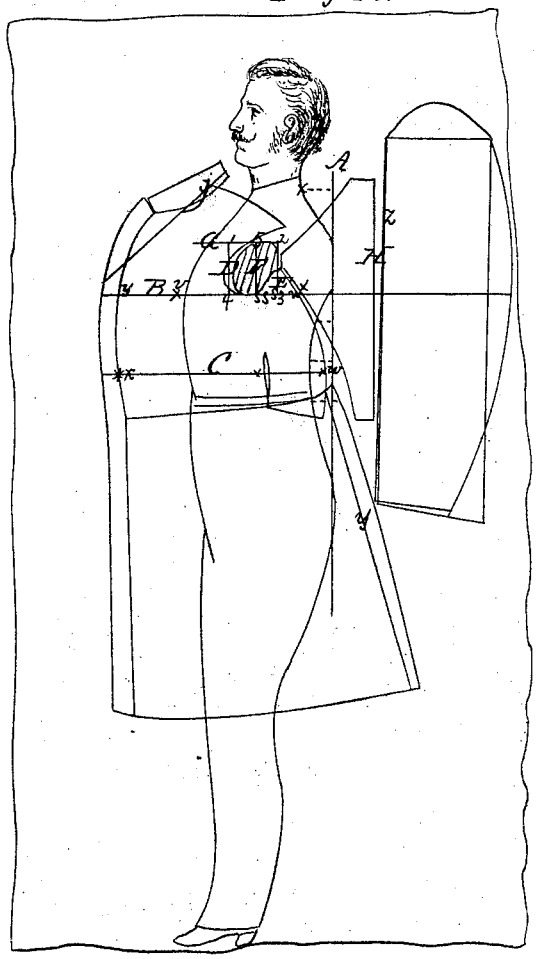
Figure 17:
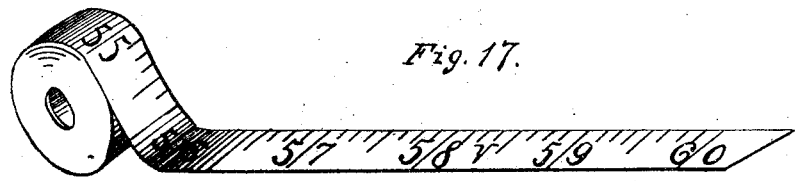

*Directions for drafting a coat, as in Figs. 13 and 14.*—First, draw a straight line, A, on the cloth. At the top of this line go in the distance from the straight-edge to the socket-bone. Then go down the straight line A to the depth from the socket-bone to under part of the arm. Then draw a horizontal line, B, square with the vertical line A. Then go down from base-line B to where the straight-edge touched on the hip. Then mark the spaces $d\ d\ d\ d$ on line A. Then go in the distance of the back-measures from the straight line A, and dot the distance. Then form the curve of the back. Then go out the depth of the breast on line B, and dot the place. Then go down to the most hollow part of the waist, and make line C. Then start from the curve-line of the back and go out the depth of the waist on line C. Then mark the center of the body on lines B and C. Then go in from line A to the back part of the shoulder on line B, and mark the point. Then go from that point half the distance or width of the shoulder to find the distance between the center of the shoulder and the center of the body. Then start at the center of the body and go half the width of the shoulder each side of the center of the body. Then draw lines D E F square with the base-line B. Then go up these lines the height of the shoulder, and draw line G. Then form curves 1, 2, 3, and 4. Then go up line E to the center, and mark the place that is to form the top of the side-body. Then start from the top of the side-body and go around the curves 1, 2, 3, and 4, back to the same place. This gives the size of the "scye" or armhole. Then form your back scye on line E. Then start at the top of your back scye and form the front scye by going in front of front line of arm enough to give room for the muscle to expand, and crossing at 5, on a natural curve, until the size of the scye previously found is marked out. This establishes the lower shoulder-point. Then take half of the two breast-measures and form a square, as shown in the diagram, Fig. 16. Then form curve 6, and measure the distance from point to point around the curve. Then take that distance and start at the center of the body on the line B, and go back on this line the distance of the length of the curve 6, and add a seam to the length of the curve, and then draw the line H on a square with line B and parallel with line A, to form the back-seam and also the width of back from line E to line H. Then start at the point where lines A and B cross each other, and go up the curve to the socket-bone. Then take the distance found and start where line B crosses line H and go up line H the distance found, and establish the top of back. Then form the back. Now take the distance between the center $s$ of the body and the center $s'$ of the shoulder, and start on line B and go forward on line B the distance between the centers from where the back crosses line B, and there make star $t$, to indicate the place where the side-body crosses line B. Then take the distance that is found between back and side body on line B, and carry it over and add to the depth of breast on line B, and there make star $u$. Then take half the width of breast-measure and start from star $u$ and go out on line B and make star $v$, to indicate the size of breast less the lapel. Then take the half of the two waist-measures and form a square on the cloth and strike a curve, 7. Then start with the tape V and go from point to point around curve 7, and take the distance found and start at the center of the waist on line C, first taking out the width of the backs at the natural waist, and going back on line C and make star $w$, to indicate the balancing-point of the waist. Then take half the width of the waist and start at the center of the body on the side and go front on line C, and make star $x$, to indicate front edge of coat less the lapel. Then take the length of curve-line of back on shoulder and start at the lower shoulder-point and sweep from line G for width of shoulder. Then take the distance, found with the tape V, from the socket-bone $a$ to line G, which was previously drawn out in front of the shoulder, and start at line G and go up that distance from line G to the socket-bone $a$, first deducting the width of the back, at the top, for a part of it. That gives the height of the front of the shoulder. Now form the body of the coat. That being done, cut out the side-body, pinning it fast at the lower part of the seam under the arm and allowing the top to swing round, and raising the lower corner of the side-body until the desired spring in the skirt is attained, (style governing this.) Then place a straight-edge at the natural waist of the side-body of the coat and draw a straight line, $y$, and keep the straight-edge bar and side-body of coat firmly together, and at the same time allow them to swing around until the straight-edge deviates from the bottom of the line $y$ an extent equal to the width of the back at the full length of waist, and then mark the top of the skirt at the point where the side-body is resting, so as to establish the height of the skirt at the back-point. It should be remarked here that the calculation is made as to what tailors understand as "whole cloth," from where the seam of the side-body comes down to the skirt under the arm, and from there forward. Now use the measure taken with the tape V, as in Fig. 11, for full length of coat. Starting at line B, Fig. 11, and going down the side-body to the bottom of it, and then taking that amount and adding to it the length of the skirt at the plait, and then taking those two amounts, added together, and starting from line B at the front edge of coat and going down to last amount found, the length of the coat will have been obtained. This done, the minor and well-understood details are marked out, and the cutting is ready to be proceeded with, excepting the formation of the sleeve.

To mark out a sleeve, take one-half of the size of the scye or armhole, and form a square the length that the sleeve is to be. Then go down the elbow, the width of the back being a part of the length of the sleeve. Then take the tape and sweep from the elbow to the upper corner of the square. Then take the fore part already cut and place it where it belongs when the coat is made up, letting the square corner in front of shoulder of coat rest on the sweep. Make a mark at the center between the square corner and the lower point of the shoulder and start at the corner of the square and go to the center and come out where the sweep crosses the square line $z$ in front. This done, the sleeve may be formed in other parts of any style desired by the taste of the cutter.

What I claim as my invention, and desire to secure by Letters Patent, is—

In measuring the sizes and determining the forms of different parts of the human body, first, using instruments substantially such as specified, or their equivalents, upon or against the specified parts of the body in such manner that right angles or corners are formed by them at the points where they cross or intersect each other, and from the sizes and forms thus ascertained, by running in from a perpendicular line, producing a bust of the measured body upon cloth, which bust, used in connection with certain measures herein indicated taken from the body, but not embraced in the bust, and with the ordinary graduated tape, serves as a guide or basis from which to draft, with certainty, a garment of the size and shape of the body measured, as set forth.

JOHN B. WEST.

Witnesses:
GUSTAVUS DEITERICH,
EDWIN S. JACOB.